United States Patent
Stuart (10) Patent No.: US 9,713,324 B1
(45) Date of Patent: Jul. 25, 2017

(54) SYSTEM AND METHOD OF A FLEXIBLE STORAGE APPARATUS

(71) Applicant: Tyler Stuart, Denver, CO (US)

(72) Inventor: Tyler Stuart, Denver, CO (US)

( * ) Notice: Subject to any disclaimer, the term of this patent is extended or adjusted under 35 U.S.C. 154(b) by 220 days.

(21) Appl. No.: 14/329,672

(22) Filed: Jul. 11, 2014

Related U.S. Application Data (60) Provisional application No. 61/847,272, filed on Jul. 17, 2013.

(51) Int. Cl.
*A01K 97/06* (2006.01)

(52) U.S. Cl.
CPC .................. *A01K 97/06* (2013.01)

(58) Field of Classification Search
CPC ................ A01K 97/06; A01K 97/08
USPC ...... 43/54.1, 57.1, 26; 206/315.11, 6.1, 413, 206/414, 415, 416, 398; 224/920; 383/38, 39; 229/87.5, 87.01, 87.03
See application file for complete search history.

(56) References Cited

U.S. PATENT DOCUMENTS

| | | | | | |
|---|---|---|---|---|---|
| 566,595 | A * | 8/1896 | Magnuson | ............. | A01K 97/06 43/57.2 |
| 1,623,429 | A * | 4/1927 | Hilbert | .................... | A01K 97/06 2/209.13 |
| 2,551,929 | A * | 5/1951 | Collins | .................... | B25H 3/00 206/349 |
| 3,115,723 | A * | 12/1963 | Kline | .................... | A01K 97/06 43/57.2 |
| 3,190,027 | A * | 6/1965 | Spangler | ................. | A01K 97/06 43/25.2 |
| 3,277,600 | A * | 10/1966 | Helfenstein | ............ | A01K 97/06 43/57.1 |
| 3,575,327 | A * | 4/1971 | Harrison | ................. | A01K 97/08 206/315.11 |
| 3,749,233 | A * | 7/1973 | McCormick, Jr. | ..... | A45C 11/26 206/373 |
| 4,186,511 | A | 2/1980 | Slacter | | |
| 4,372,073 | A | 2/1983 | Goldman | | |
| 4,577,433 | A * | 3/1986 | Jones | ...................... | A01K 97/06 43/57.2 |
| 4,641,454 | A * | 2/1987 | Ray | ........................ | A01K 89/00 224/901.4 |
| 4,691,469 | A | 9/1987 | Alsobrook et al. | | |
| 4,703,581 | A * | 11/1987 | Whittier | ................. | A01K 97/06 43/57.1 |
| 4,726,141 | A * | 2/1988 | McBride | ................. | A01K 97/08 206/315.11 |
| 4,901,899 | A * | 2/1990 | Barrett | .................... | A01K 97/06 206/315.11 |
| 4,970,821 | A * | 11/1990 | Young | ..................... | A01K 97/06 150/113 |
| 5,277,306 | A * | 1/1994 | Sargent | .................. | A01K 97/06 150/154 |
| 5,394,638 | A * | 3/1995 | Raymond | .............. | A01K 97/06 43/54.1 |
| 5,417,354 | A * | 5/1995 | Jones | ..................... | A01K 97/08 206/315.11 |

(Continued)

*Primary Examiner* — Peter M Poon
*Assistant Examiner* — Magdalena Topolski
(74) *Attorney, Agent, or Firm* — Sheridan Ross PC (57) ABSTRACT

A storage apparatus for receiving fishing articles and the like comprises first and second layers. One layer is adapted to receive articles such as hooks and a second layer is provided as a protective and waterproofing layer. Securing members are provided to secure the device in at least a closed position.

17 Claims, 5 Drawing Sheets

(56) References Cited

U.S. PATENT DOCUMENTS

| | | | | |
|---|---|---|---|---|
| 6,079,148 A | * | 6/2000 | Yonenoi | A01K 97/06 43/57.1 |
| 6,931,782 B1 | * | 8/2005 | Pitcock | A01K 97/08 224/922 |
| 7,076,912 B2 | | 7/2006 | Burdette et al. | |
| 2003/0041503 A1 | * | 3/2003 | Marjerison | A01K 97/01 43/54.1 |
| 2004/0031655 A1 | * | 2/2004 | Milionta | A01K 97/06 190/110 |
| 2005/0279012 A1 | * | 12/2005 | Wieringa | A01K 97/06 43/54.1 |
| 2006/0196102 A1 | * | 9/2006 | Gagnon | A01K 89/00 43/26 |
| 2007/0113463 A1 | * | 5/2007 | Duncan | A01K 97/08 43/26 |
| 2012/0233904 A1 | * | 9/2012 | Fox | A01K 97/06 43/4 |
| 2015/0257377 A1 | * | 9/2015 | Moore, Jr. | A01K 97/08 43/26 |

* cited by examiner

SYSTEM AND METHOD OF A FLEXIBLE STORAGE APPARATUS

This U.S. Non-Provisional Patent Application claims the benefit of priority from U.S. Provisional Patent Application 61/847,272, filed Jul. 17, 2013, the entire disclosure of which is hereby incorporated by reference in its entirety.

FIELD OF THE INVENTION

The present invention relates generally to storage devices. More specifically, embodiments of the present invention relate to a flexible storage device that may be rolled for compact and convenient transport of the device and its contents. Devices of the present invention are suitable for containing and transporting fishing devices and accessories, for example.

BACKGROUND

For many years sport fishermen have used various types of compartmentalized boxes and other apparatus for storing fishing articles, including flies, tippet, leader, weights, reels, tools, lures, and lines to name a few. Such devices and boxes are generally constructed of metal or a rigid plastic material and have hinged lids that open to reveal an array of compartments generally formed in trays and which receive the lures, leaders and weights. A larger storage compartment is generally provided underneath the trays for storing larger items such as reels and the like. These tackle boxes suffer from numerous drawbacks, including their generally large size and lack of adjustability or compressibility. If such devices accidentally fall into a body of water, they quickly sink or remain buoyant only so long as no water has entered the interior of the tackle box. While fishing, the tackle box must be left open in order to display the tackle to the fisherman. Thus, if the tackle box is accidentally dropped into a river or lake, the tackle as well as the box is often times irretrievable. Also, a large struggling fish landed by the fisherman can readily upset a tackle box and spill its contents.

Other types of fishing tackle storage apparatus, designed generally to hold only lures and hooks, have been developed. One such apparatus is disclosed in U.S. Pat. No. 4,186,511 to Slacter, which is hereby incorporated by reference in its entirety. Slacter discloses a lure box having a block of elastomeric material into which the hooks of fishing lures are removably inserted.

U.S. Pat. No. 4,372,073 to Goldman, which is hereby incorporated by reference in its entirety, discloses a tackle storage apparatus with a lure mounting pad. Various features of Goldman, including lure mounting features, are contemplated for use in various embodiments of the present invention.

U.S. Pat. No. 4,691,469 to Alsobrook et al., which is hereby incorporated by reference in its entirety, discloses a system and method of managing fishing tackle. Various features of Alsobrook, including pocket systems as shown and described herein, are contemplated for use in various embodiments of the present invention.

U.S. Pat. No. 7,076,912 to Burdette et al., which is hereby incorporated by reference in its entirety, discloses a fly pack apparatus comprising an openable drum. Various features of Burdette, including fastening features, are contemplated for use with various embodiments of the present invention.

BRIEF SUMMARY OF THE INVENTION

Various embodiments of the present invention provide a rollable storage device for tackle and the like. It is an object of the present invention to provide a device and system that saves space by providing packing efficiency, provides a highly portable device, and provides ease of access to fishing tackle and/or other contents.

In various embodiments, a rollable storage device is provided that is capable of rolling into a compact and substantially cylindrical shape. Such embodiments provide for a storage device that comprises at least a first open position wherein the device is provided in an unfurled, substantially planar position and allows for access to contents stored within the device, and a second closed position wherein the device is provided in a rolled and relatively compact position wherein contents are secured.

In certain embodiments, a storage device is provided that comprises means for securing the device in at least a closed position to facilitate transport and storage. In various embodiments, such means include straps, clasps, rivets, bungee cords, end caps, ties, and the like.

In various embodiments, storage devices of the present invention comprise a first material and a second material, the first material being applied to and comprising substantially the same with and length dimensions as the second material. In particular embodiments, the first material comprises an attachment portion of the storage device, wherein hooks and similar features may be secured to the first material to retain hooks and related components. The first material may comprise, for example, a foam or porous material to allow ease of securing and detaching hooks thereto. It is contemplated that the first material may comprise any one or more materials suitable for this purpose including, but not limited to, EVA foam, wool, fleece, various textiles, and similar materials. In preferred embodiments, the first material comprises a non-rigid material such that the first material does not impede rolling or folding of the device.

In certain embodiments, the second material comprises a rollable material that similarly does not impede rolling or folding of the device. It is further contemplated that the second material preferably comprises a different material than the first material, and wherein the second material comprises a reduced permeability with respect to the first material such that hooks which may be inserted at least partially into the first material and do not easily penetrate the second material. In various embodiments, the second material may comprise any one or more of Thermoplastic Elastomer ("TPE"), CORDURA, and/or various rubbers. The second material thereby provides for safety features to reduce risk of injury to a user. It is further contemplated that the second material of various embodiments of the present invention comprises a waterproof or water resistant material. In certain embodiments, the storage device comprises buoyancy such that the device is capable of floating in water. More specifically, at least one of the first material and the second material and/or the combination of the first and second material comprises buoyancy that enables flotation of the assembled device.

In various embodiments, the present invention provides a rollable storage device comprising a first and second material and further comprises securing features to secure the device in at least a closed position.

In certain embodiments, at least one elastic band is provided to secure the storage device in a closed position. For example, in certain embodiments, first and second elastic bands are provided and secured to the storage device via a rivet or similar fastener. The bands may be passed or looped around a diameter of a rolled or closed storage device and secure the device in a rolled position. Although closed devices are referred to herein as comprising a diameter, it will be expressly recognized that closed or rolled devices are not limited to devices comprising a cylindrical shape. Indeed, various embodiments are contemplated wherein the closed device comprises a cylindrical, semi-cylindrical, triangular, ovoid, rectangular, and/or various other cross-sectional shapes.

In various embodiments, the present invention provides a storage device comprising a lure mounting pad fabricated from foamed elastomeric flotation material having a closed cell structure. The lure mounting pad is adapted for detachably receiving at least one hook of a hook-type fishing lure so as to enable mounting of lures and/or flies. One side of the lure mounting pad is preferably affixed to a soil and/or water-resistant backing. Additional tackle pockets for holding other items such as weights, swivels and leaders and an additional flotation device may be affixed to the backing. In various embodiments, hand and shoulder straps may be provided for easy carrying of the device.

In certain embodiments, storage features are provided on or in association with a first layer or lure mounting pad. For example, one or more pockets may be formed on or connected to the first material. Such pockets may be suitable for receiving and storing articles that do not comprise hooks or are otherwise not suitable for securing to the first material. Looped features, including elastic loops may be provided on the first layer to further secure features. Magnets and hook-and-loop closures may further be provided on the first material to receive objects.

In certain embodiments, it is contemplated that the device comprises a hook and loop closure feature wherein a hook and loop material extends as a strip along an exterior longitudinal end of the device, and a corresponding hook and loop material extends as a strip along an interior opposing longitudinal end of the device. Thus, when the device is rolled or closed, the hook and loop closure is adapted to secure the device in the closed state. Such hook and loop features may be provided in addition to or in lieu of various other closure means and features as shown and described herein.

An object of the present invention is to provide a new and improved fishing tackle storage apparatus that has a lure mounting pad fabricated from a foamed elastomeric flotation material having a closed cell structure so that the fishing tackle storage apparatus will remain buoyant.

Another object of the invention is to provide an improved fishing tackle storage apparatus that can be made compact for transport and storage. Still another object of the invention is to provide an improved fishing tackle storage apparatus with improved closure features, including fasteners and end closures to secure the device at least in a closed position.

In certain embodiments, one or more flexible wires comprising a memory are provided in the storage device. For example, in one embodiment, it is contemplated that longitudinal edges of the device comprise a flexible steel wire with a memory to provide a structure to the device and maintain the device in an open position when desired, while not substantially impeding rolling or closing of the device to a closed position.

In various embodiments, a rollable tackle storage is provided that is capable of laying at least partially flat for inserting or removing flies and lures. The device may be "rolled" to form a compact, substantially cylindrical state to enhance mobility and storage.

In certain embodiments, the present invention comprises an outer flexible shell layer, an inner flexible foam layer, end structure supports, and end closure cups or closure means as shown and described herein.

These and other objects of the invention will become apparent from the following detailed description of the invention when taken with the accompanying drawings.

DETAILED DESCRIPTION OF THE INVENTION

Figure 1:
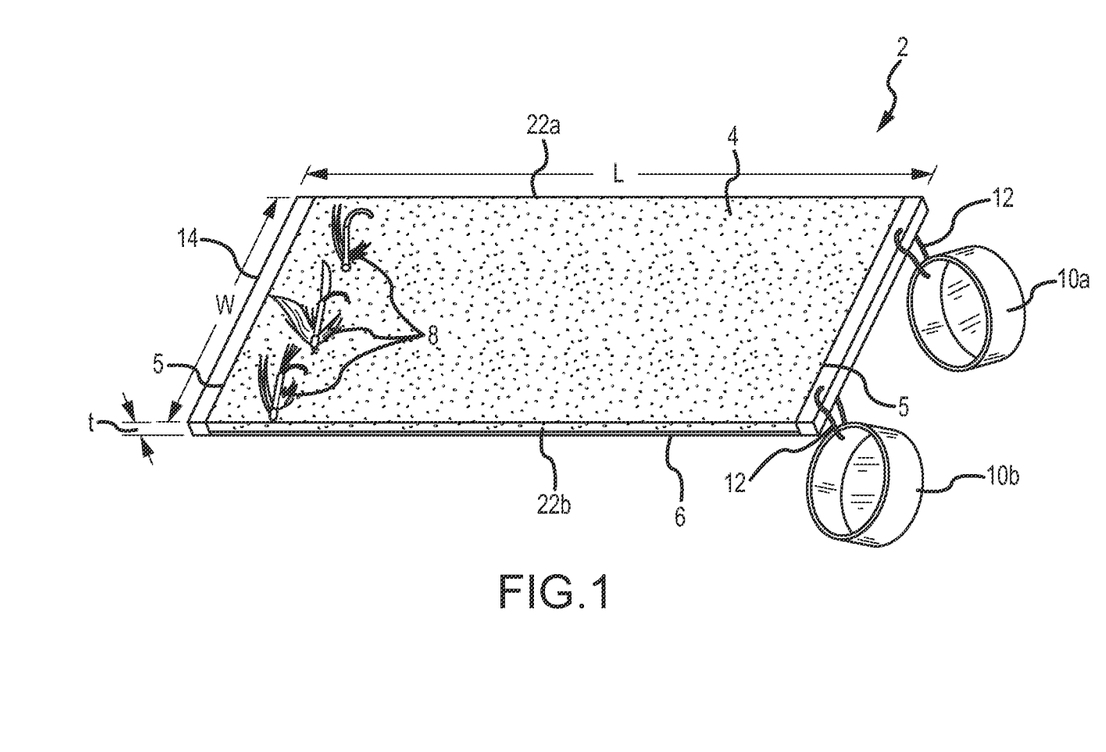
FIG. 1 is a front perspective view of a storage device in an open position according to one embodiment of the present invention.

FIG. 1 is a perspective view of a storage device 2 according to one embodiment of the present invention and wherein the device 2 is provided in an open position. As shown, the storage device 2 comprises a first layer 4 and a second layer 6. In the depicted embodiment, the first layer 4 comprises a rollable layer (e.g. Ethylene vinyl acetate "EVA" foam or similar) which is adhered or otherwise secured to a second layer 6, the second layer being rollable with the first layer 4 such that both layers form a generally singular unit and wherein the second layer 6 is provided as an outer layer in a rolled or closed position. In various embodiments the second layer 6 comprises a thermoplastic elastomer or similar type material. For reference, the storage device 2 comprises a length L, a width W, and a thickness t. In various embodiments, a thickness t of the device generally consists of the combined thicknesses of the first layer 4 and the second layer 6. In certain embodiments, the first layer 4 comprises a thickness of between approximately 0.10 and 0.75 inches. In certain embodiments, the second layer 6 comprises a thickness of between approximately 0.05 and 0.50 inches.

It will be recognized, however, that storage devices are not limited to any particular dimension, proportion or shape. Although FIG. 1 provides a storage device of substantially rectangular construction and wherein a length L is longer than a width W, the present invention is not so limited. Indeed, any number of shapes and proportions are contemplated. Additionally, devices of the present invention are scalable to accommodate needs and desires of various users. Certain embodiments of the present invention contemplate a device with a Length of between approximately 8 inches and 24 inches, a width of between approximately 6 inches and 18 inches, and a thickness of between approximately 0.125 and 1.00 inches. Various alternative dimensions are also contemplated, such as where a user desired to either store more contents 8 or, alternatively, where smaller size and increased portability is desired.

Contents 8 of the device 2 may include, but are not limited to, fishing devices comprising hooks such as flies, lures, loose hooks, lines, weights, and similar. In preferred embodiments, the first layer 4 comprises a material that is adapted to receive hooks. For example, at least a portion of the first layer 4 may comprise a foam, wool, or other porous material that is easily engaged by a hook, capable of retaining said hook, and further capable of releasing said hook when contents 8 are desired to be withdrawn from the device 2. The second layer 6 preferably comprises a non-permeable or non-porous material providing a sort of shell to the device. In various embodiments, the second layer 6 comprises a material that is substantially non-permeable to hooks and other sharp objects so as to prevent piercing of the second layer 6 and providing safe handling of the device. Additionally, the second layer 6 preferably comprises a hydrophobic or water resistant material, to repel water and moisture. The second layer 6 thus increases the overall buoyancy of the device 2 and serves to keep contents dry or partially dry when the device 2 is in a closed position.

In an alternative embodiment, and in lieu of or in addition to caps 10 being provided to secure the device, one or more elastic straps are provided that may be looped or secured around a closed and/or rolled device 2. For example, both free ends of a length of elastic material may be secured to an edge portion of the device 2, wherein the looped length of material may be passed around a rolled device 2 to secure the device in the closed position. In yet another embodiment, snaps, clasps, and/or rivets may be provided on opposing lateral ends 5 of the device 2, and the device secured in a closed position by securing the snaps. It is also contemplated that straps (e.g. nylon) and associated plastic buckle closures may be provided to wrap around and secure the device, at least in a closed position. In other embodiments, elastic cords (e.g. bungee) cords may be provided and adapted to surround the device and secure it in a closed position. The elastic cords may be provided as separate components or secured to a portion of the device (e.g. a lateral edge). Such devices may be referred to herein as "securing means" or "closing means." However, such means and devices for maintaining the device 2 in closed position are not limited to such features.

As further shown in FIG. 1, the device 2 comprises caps 10a, 10b for securing the ends of the device 2 when in a closed position. As shown, the caps 10a, 10b are provided on one end of the device 2, and secured to or proximal to a lateral end portion of the device 2 via tethers 12. The end cap(s) preferably comprise a circular member with sidewalls extending therefrom. In various embodiments, the tethers 12 comprise elastic members that allow freedom of movement of the caps 10a, 10b and also bias the caps 10 in a preferred direction. Although the caps 10 are depicted as being provided in a certain location in FIG. 1, it will be recognized that the present invention is not so limited. In certain embodiments, caps 10 are not provided. In additional embodiments, the caps may comprise separate, unattached features, or may be secured at various alternative locations, including at one or more positions along a length dimension L of the device 2.

In various embodiments, the first layer 4 is generally fabricated from a sheet of foamed elastomeric flotation material formed into a rectangular shape. The foamed elastomeric flotation material has a closed cell structure substantially impenetrable to water so that its buoyancy is retained. The second layer 6 preferably comprises a material substantially resistant to hook penetration. In certain embodiments, the first layer 4 is fabricated from a sheet of ETHAFOAM brand polyethylene foam sold by the Dow Chemical Company. ETHAFOAM has a closed cell structure with cell sizes varying from about 1.0 to about 1.4 mm. It is available in several forms including planks, sheets and bars. Because it has a closed cell structure the water absorption of ETHAFOAM is only about 0.2 to about 0.4 percent by volume. Its low density provides a buoyancy in water of about 60 pounds per cubic foot (in sheet form). The high buoyancy and low water absorption of ETHAFOAM allow the device 2 to remain afloat indefinitely even when heavily laden with tackle. ETHAFOAM is also highly resistant to tearing and will remain usable for a prolonged period. A sheet thickness of about ¼ inch will accommodate most hook sizes.

Figure 2:
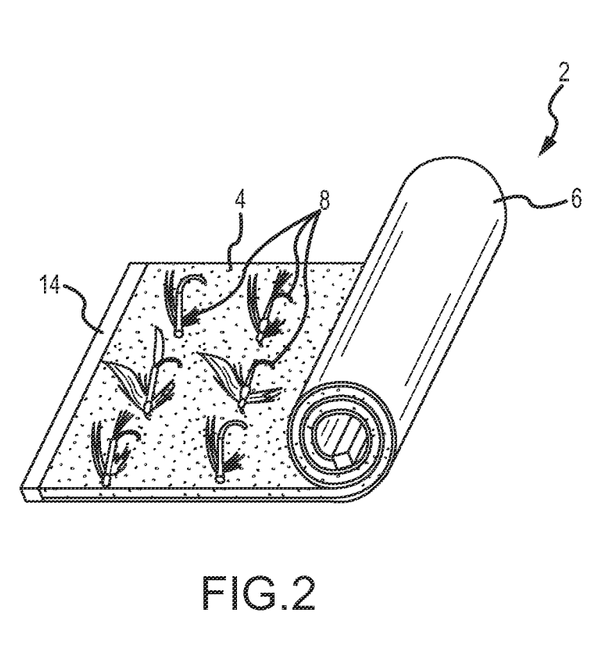
FIG. 2 is a front perspective view of a storage device in a partially open position according to the embodiment of FIG. 1.

FIG. 2 is a perspective view of the device 2 in a partially closed position, such as during rolling of the device 2. As shown, the second layer 6 is provided as an outer layer during rolling, and contents 8 of the device 2 are entrained or consumed by the rolled structure. Accordingly, contents 8 are secured within the device 2 by a combination of hooks being secured to the first layer 4 and by compression force(s) provided by the rolled arrangement.

The second layer 6 is preferably fabricated from a soil- and water-resistant material. Such materials may include CORDURA or 500-1,000 denier nylon that may have an optional urethane coating. This material has the advantages of being very resistant to soil, water and wear yet is very light in weight. Of course, other materials such as reinforced polyethylene sheet may be used to fabricate the second layer 6. Polyethylene sheet can be "heat sealed" so that need for stitching or sewing of the second layer 6 can be eliminated.

Figure 3:
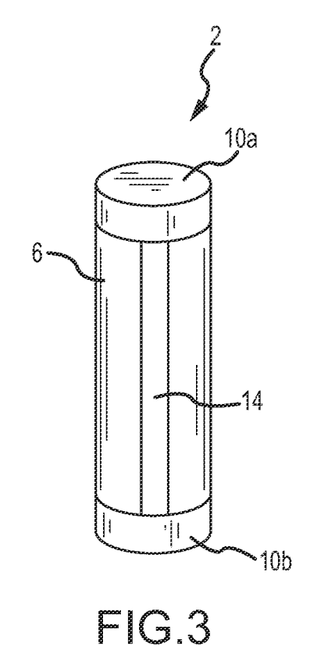
FIG. 3 is a front perspective view of a storage device in a closed position according to the embodiment of FIG. 1.

FIG. 3 is a perspective view of one embodiment of a storage device 2 provided in a fully closed position. As shown, the device 2 is provided in a rolled position, creating a substantially cylindrical structure with the second layer 6 provided as an outer surface. In the depicted embodiment, an end support member 14 is provided. The end support member 14 of the depicted embodiment comprises a substantially rigid strip of material (e.g. plastic) to create a column-like support structure and give rigidity to the rolled or closed device 2. End caps 10a, 10b are provided in a closed position and cover a first and second rolled end of the device 2, the ends otherwise being open or exposed.

Figure 4:
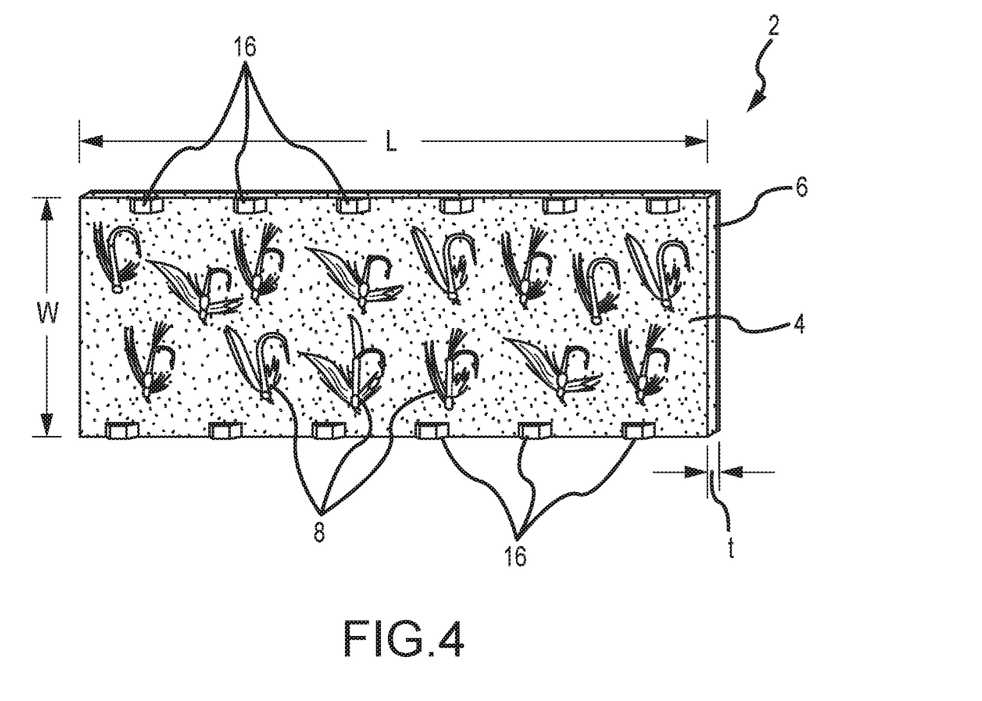
FIG. 4 is a front perspective view of a storage device in an open position according to one embodiment of the present invention.

FIG. 4 is a perspective view of one embodiment of a storage device 2 in an open position. The storage device 2 of FIG. 4 comprises a plurality of spacers 16 positioned along at least one longitudinal edge of the device 2, and preferably along both peripheral edges of the device 2. The spacers 16 preferably comprise a lightweight rigid material, such as foam, and guide the rolling and/or folding of the device. In certain embodiments, spacers are provided as a foam, such as EVA foam and are capable of receiving fishing articles and the like. In certain embodiments, spacers may comprise a plurality of foam extensions provided to adjacent to one another and on each edge of the device. The spacers may extend above the first layer 4 by between approximately 0.1 inches and approximately 2 inches, depending on the amount of space desired in the rolled configuration. In various embodiments, the spacers comprise frustoconical or pyramidal frustum shaped objects that extend above the first surface. In alternative embodiments, the spacers are provided as foam (or similar) blocks or protrusions with a height, a width and a length, and extending above the first surface. The spacers 16 prevent the device 2 from being rolled too tights and/or into a cylinder of a diameter that is too small. In such situations where a device is rolled too tightly, damage to contents 8 may occur, particularly where contents are fragile items such as elaborate fly patterns or streamers. It will be expressly recognized that spacers 16 may comprise any number of geometric shapes and/or dimensions.

Figure 5:
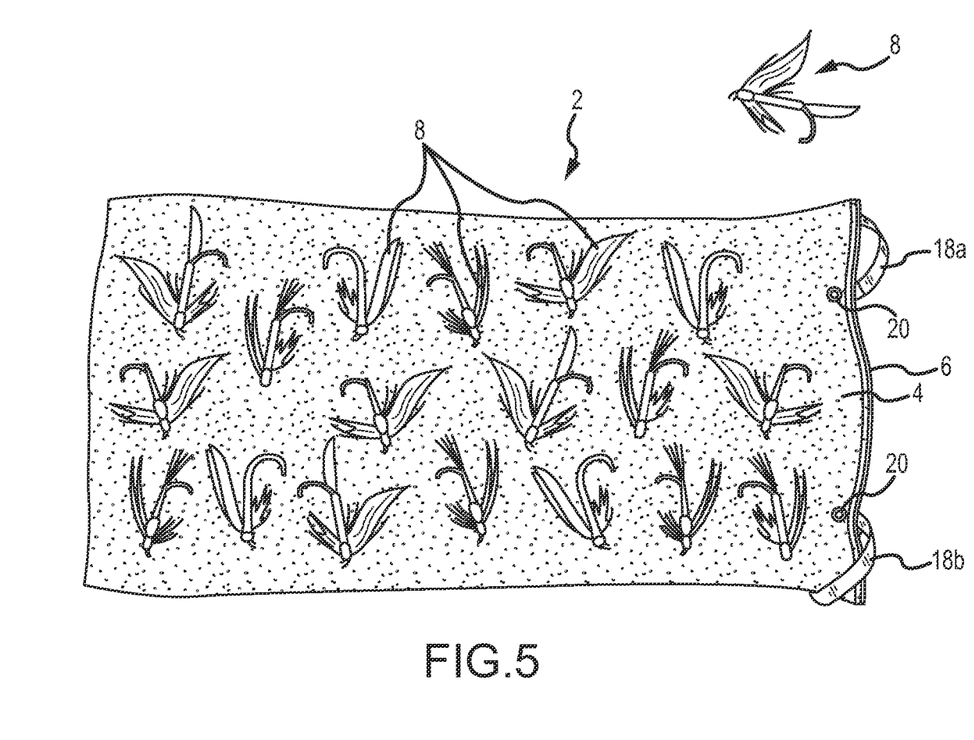
FIG. 5 is a front perspective view of a storage device in an open position according to one embodiment of the present invention.

FIG. 5 is a cross-sectional elevation of a storage device 2 according to one embodiment of the present invention. As shown, the device 2 comprises a first layer 4 overlaid on a second layer 6. In various embodiments, the first layer 4 is adhered to the second layer 6 via one or more adhesives, such as a known binding adhesive. In certain embodiments, the first 4 and second 6 layers are secured together by a binding adhesive and/or a sewn edge. The sewn edge may extend around substantially the entire perimeter of the device, or only a portion thereof.

Figure 6:
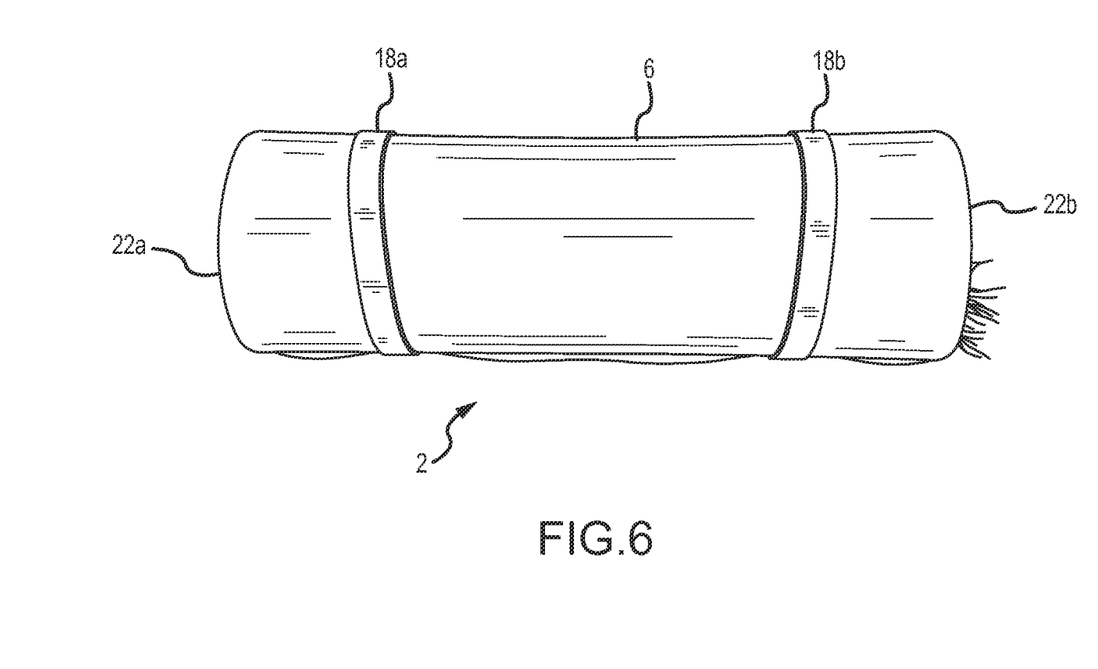
FIG. 6 is a front perspective view of a storage device provided in a closed position according to one embodiment of the present invention.

FIG. 6 is a perspective view of a storage device 2 according to one embodiment of the present invention. FIG. 7 is a perspective view of the storage device 2 of FIG. 6, wherein the device is provided in a closed position. The device 2 is depicted as comprising a plurality of contents 8 in the form of flies and/or streamers. The contents 8 are secured to a first material 4 as shown and described herein. The first material is secured to a second material 6. Closure means in the form of elastic straps 18a, 18b are provided. The straps or bands 18 comprise a length of elastic material, with free ends secured to the device at a single location via a rivet 20 or similar fastener. As shown in FIG. 7, when the device is rolled or folded, the straps 18a, 18b may be passed around longitudinal ends 22a, 22b to retain the device 2 in the closed position.

What is claimed is:

1. A storage apparatus adapted for storing and transporting fishing articles, the apparatus comprising:
   a first material comprising a mounting pad adapted for detachably receiving a plurality of hooks, said first material comprising a substantially flexible material adapted for at least one of rolling and folding;
   a plurality of spacers extending from the first material along at least one edge of the storage apparatus, the plurality of spacers comprising foam extensions comprising a pyramidal frustum shape which extend above the first material between approximately 0.1 and 2.0 inches, and wherein the spacers are operable to provide shape to the apparatus when the apparatus is provided in a rolled or folded position;
   a second material substantially resistant to hook penetration, the second material integrally fixed to a first side of said first material;
   the first material and the second material being rollable into a compact, substantially cylindrical shape;
   wherein the apparatus comprises a length of not more than approximately 24 inches and a width of not more than approximately 18 inches when the apparatus is provided in an un-rolled position;
   at least one securing member fixed to at least one of the first material and the second material, the securing member adapted to encircle a diameter of the storage apparatus when the apparatus is provided in said substantially cylindrical shape and secure the apparatus in said cylindrical shape.

2. The storage apparatus of claim 1, wherein the securing member comprises an elastic member, the elastic member comprising a first end and a second end, the first end and the second end being secured to the storage apparatus and forming a loop for passing around the apparatus at least when the apparatus is provided in a closed position.

3. The storage apparatus of claim 1, wherein the first material comprises ethylene-vinyl acetate foam.

4. The storage apparatus of claim 1, wherein the second material comprises a thermoplastic elastomer-backed fabric.

5. The storage apparatus of claim 1, wherein a combined thickness of the first material and the second material comprises a thickness of between approximately 0.125 inches and approximately 0.50 inches.

6. The storage apparatus of claim 1, wherein the storage apparatus is devoid of a carrying strap and a handle.

7. A storage apparatus adapted for storing and transporting fishing articles, the apparatus comprising:
   a first rectilinear member comprising a mounting pad adapted for detachably receiving a plurality of hooks, said first rectilinear member comprising a substantially flexible material adapted for at least one of rolling and folding;
   a second rectilinear member substantially resistant to hook penetration, the second member integrally fixed to a first side of said first member;
   the first rectilinear member and the second rectilinear member being rollable into a compact, substantially cylindrical shape;
   wherein the first rectilinear member comprises a plurality of spacers extending therefrom, the plurality of spacers being provided along at least one edge of the storage apparatus and wherein the plurality of spacers each comprise a height, and wherein said height is between approximately 0.1 inches and approximately 2.0 inches;
   wherein the plurality of spacers comprise pyramidal frustums extending above the first rectilinear member;
   wherein the apparatus comprises a length of not more than approximately 24 inches and a width of not more than approximately 18 inches when the apparatus is provided in an un-rolled position;
   at least one securing member adapted to encircle a diameter of the storage apparatus when the apparatus is provided in said compact, substantially cylindrical shape; and
   the securing member comprising a length of material having a first end and a second end, the first end and the second end secured to the apparatus and forming a loop extending therefrom.

8. The storage apparatus of claim 7, wherein the first material comprises ethylene-vinyl acetate foam.

9. The storage apparatus of claim 7, wherein the second material comprises a thermoplastic elastomer-backed fabric.

10. The storage apparatus of claim 7, wherein the storage apparatus comprises a thickness of between approximately 0.125 inches and approximately 0.50 inches.

11. The storage apparatus of claim 7, wherein the storage apparatus is devoid of a carrying strap and a handle.

12. The storage apparatus of claim 7, wherein at least one of the plurality of spacers comprises a foam protrusions extending above the first rectilinear member.

13. A storage apparatus adapted for storing and transporting articles, the apparatus comprising:
   a first member comprising a mounting pad adapted for detachably receiving articles, said first member comprising a substantially flexible material adapted for at least one of rolling and folding;
   a plurality of spacers provided along a first edge and a second edge of the first member, wherein each of the plurality of spacers comprises a foam protrusion having a pyramidal frustum shape with a height of between approximately 0.1 and 2.0 inches extending above the first member;

a second member, the second member comprising a hydrophobic material integrally fixed to a first side of said first member;

the first member and the second member being rollable into a compact, substantially cylindrical shape;

wherein the apparatus comprises a length of not more than approximately 24 inches and a width of not more than approximately 18 inches when the apparatus is provided in an un-rolled position;

at least one securing member operable to encircle a diameter of the storage apparatus when the apparatus is provided in said compact, substantially cylindrical shape; and the securing member comprising a length of material having a first end and a second end, the first end secured to the apparatus.

14. The storage apparatus of claim 13, wherein the first material comprises ethylene-vinyl acetate foam.

15. The storage apparatus of claim 13, wherein the second material comprises a thermoplastic elastomer-backed fabric.

16. The storage apparatus of claim 13, wherein a combined thickness of the first member and the second member comprises a thickness of between approximately 0.125 inches and approximately 0.50 inches.

17. The storage apparatus of claim 13, wherein the storage apparatus is devoid of a carrying strap and a handle.

\* \* \* \* \*